United States Patent [19]

Krakauer et al.

[11] Patent Number: 4,524,266

[45] Date of Patent: Jun. 18, 1985

[54] METHOD OF AND APPARATUS FOR DISCRIMINATING BETWEEN VARIOUS TYPES OF CHECK-OUT PERIODS IN EMPLOYEE TIME-RECORDING SYSTEMS AND THE LIKE

[75] Inventors: Lawrence Krakauer, Wayland; Lawrence Bliss, Winchester, both of Mass.

[73] Assignee: Kronos, Inc., Boston, Mass.

[21] Appl. No.: 416,719

[22] Filed: Sep. 13, 1982

[51] Int. Cl.³ .................... G06K 7/10

[52] U.S. Cl. .................... 235/377; 346/82

[58] Field of Search .................... 235/377; 346/20, 82

[56] References Cited

U.S. PATENT DOCUMENTS

| | | | |
|---|---|---|---|
| 3,805,026 | 4/1974 | Anders | 346/82 X |
| 4,011,434 | 3/1977 | Hockler | 346/82 X |
| 4,270,043 | 5/1981 | Baxter et al. | 346/82 |
| 4,423,314 | 12/1983 | Kato et al. | 235/377 |

*Primary Examiner*—David L. Trafton

*Attorney, Agent, or Firm*—Rines and Rines, Shapiro and Shapiro

[57] ABSTRACT

This disclosure is concerned with automatically identifying authorized break, meal and other time intervals in check-out and check-in of employee timecards in time-recording systems and the like and accommodating for the same in computing total working hours in such systems.

4 Claims, 3 Drawing Figures

Figure 1:
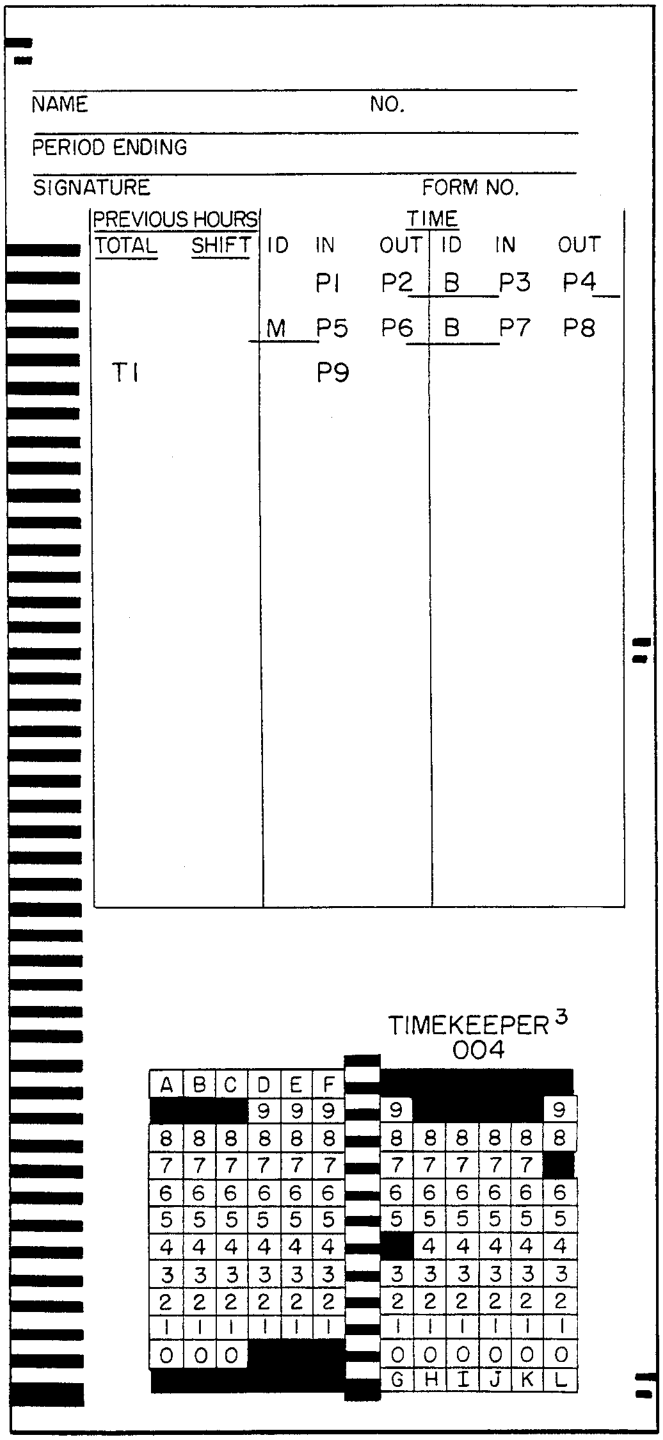

METHOD OF AND APPARATUS FOR DISCRIMINATING BETWEEN VARIOUS TYPES OF CHECK-OUT PERIODS IN EMPLOYEE TIME-RECORDING SYSTEMS AND THE LIKE

The present invention relates to methods of and apparatus for employee time-recording and the like, being more particularly concerned with automatic techniques for discriminating between various types of check-in and check-out periods including allowed breaks as for lunch and other episodes of this sort and unauthorized time off or normal check-outs.

In U.S. Pat. No. 4,270,043, issued to the common assignee of the present application, a most satisfactory time-recording system is disclosed in which check-in and check-out times are recorded on time cards or the like and various computer-program-controlled computations are automatically effected and printed or recorded on the cards or other media. Such operation, however, sometimes requires interpretation of some of the recorded entries on the cards, as for the purpose of distinguishing a paid break from an unauthorized or other absence, and the like. It is to the problem of automatically treating with various breaks and lunches and other absences taken by employees that the invention is primarily directed. It is important for the time-recording system to be able to identify these intervals because they are often treated for payroll purposes in a special manner or in different manners. It is very common, for example, to desire a record of the duration of a morning or afternoon break, but with the time of check-out not to be deducted from pay. Similarly there are often special restrictions on lunch intervals; for example, the lunch may be restricted to under a half-an-hour or under an hour, with penalties to be assessed for absence substantially greater than such allowed time periods by way of deduction from pay of the time taken off over the specified times. A time-recording system that simply records check-in and check-out times and computes the time worked as the difference between the in and the out times is thus inadequate to treat these special intervals.

Such special intervals, in accordance with the present invention, are properly automatically identified. The philosophy of such identification resides in identifying out intervals by time duration or ranges of the same. If, for example, a permissible break were normally 15 minutes and an allowed lunch 30 minutes, any check-out less than 22 minutes might be assumed to be a break; whereas an absence greater than 22 minutes but less than 45 minutes, say, would be assumed to be a lunch. If a person is out more than 45 minutes, however, then it is assumed that the check-out represents an actual leaving of work for that time-recording period, and the next check-in will be treated as the start of a new time-recording period—not a mere out interval, but an actual work interruption between two periods of time-recording. Unlike conventional check-in/check-out time-recording operations, thus, the invention takes the very different tack, previously contraindicated by current time-recording methodology, of causing the time-recording system to look at the out/in interval as an interval, instead of looking at the in/out interval as an interval. In other words, contrary to accepted techniques, the invention causes the system to look at the elapsed time not worked, as opposed to the elapsed time worked—a difficult idea to have evolved in this industry because of the fact that the art inherently treated with the time worked as the time from coming in to check-out punch. The invention required, to the contrary, a sort of mental inversion to think of the procedure from the other side; i.e. that once the person is in for the day, then during the day the system looks at out/in intervals and indentifies breaks and distinguishes the same from actual departure from work. Under the technique of the invention, accordingly, the time-recording system is provided effectively with a table of out-interval lengths which it uses to identify permissible breaks and lunches or the like, and out-for-the-day check-outs from the length of time before the next check-in occurs. Additionally, to accommodate for an extra long break that may be authorized, such as a half-hour break in the above example, the recording system would identify such as a lunch, under the rules previously suggested. The invention therefore further provides a means of later editing by the supervisor to allow this interval which the time-recording system identified as a lunch to be identified rather as a break. When the time-recording system prints or records upon the time-cards or other media, it prints the identification of the break or lunch or other out interval by its interpretation of these rules, and these identifications can then be altered or corrected later by the supervisor if the supervisor from knowledge knows that the interval was not as interpreted by the system.

An object of the present invention, accordingly, is to provide a new and improved method of and apparatus for time-recording that automatically discriminates between various types of check-out periods and identifies and records the same on timecards or other media, permitting appropriate automatic time-credit and time-deduction computations taking into account permissible and unauthorized time-out intervals.

A further object is to provide an improved time-recording system and technique of more general applicability as well.

Other and further objects will be pointed out hereinafter and are more particularly delineated in the appended claims.

In summary, from one of its viewpoints, the invention embraces in a timecard recording apparatus, a method of monitoring the time between check-in and check-out of the timecard, that comprises, recording and printing the check-in time on the timecard; storing the times of subsequent check-outs and check-ins; comparing the time interval between each subsequent stored check-out and the next following check-in with predetermined permitted break, meal or related time intervals and printing the same on the timecard; and computing the total time from the initial check-in time to the last check-out time which precedes a subsequent check-in time occurring at a time period following the last check-out time greater than the predetermined time intervals, thereby automatically adjusting to include said permitted time intervals; and printing the total adjusted time upon the card. Preferred and best mode embodiments and details are later presented.

Figure 2:
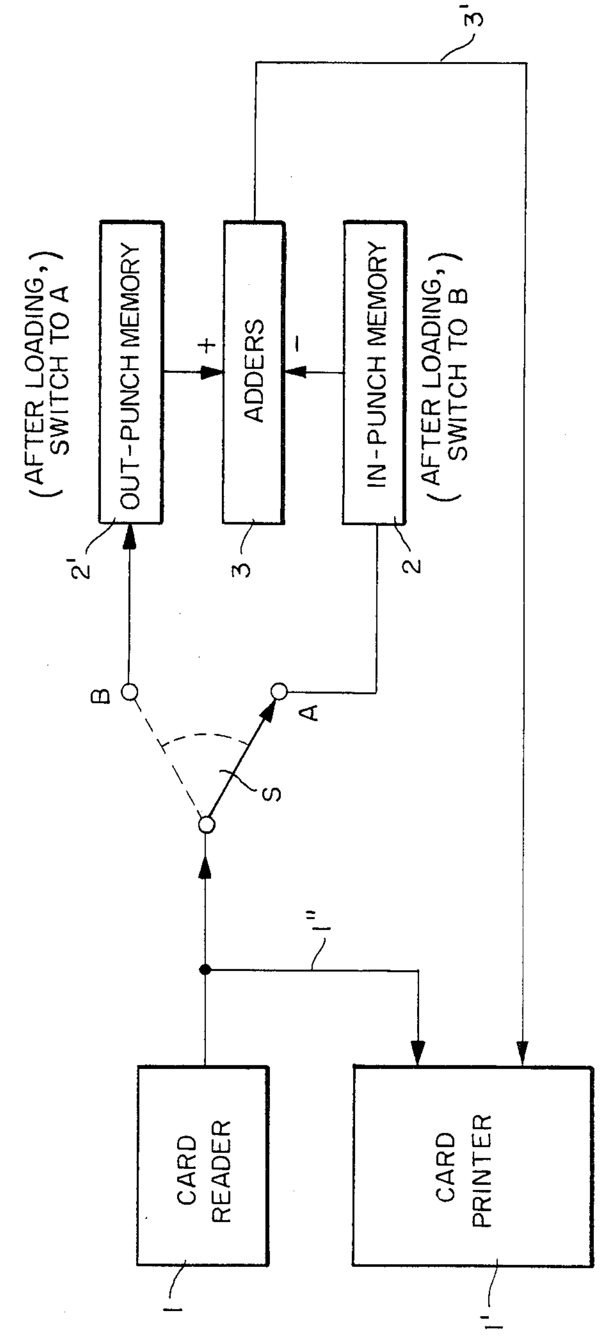
Figure 3:
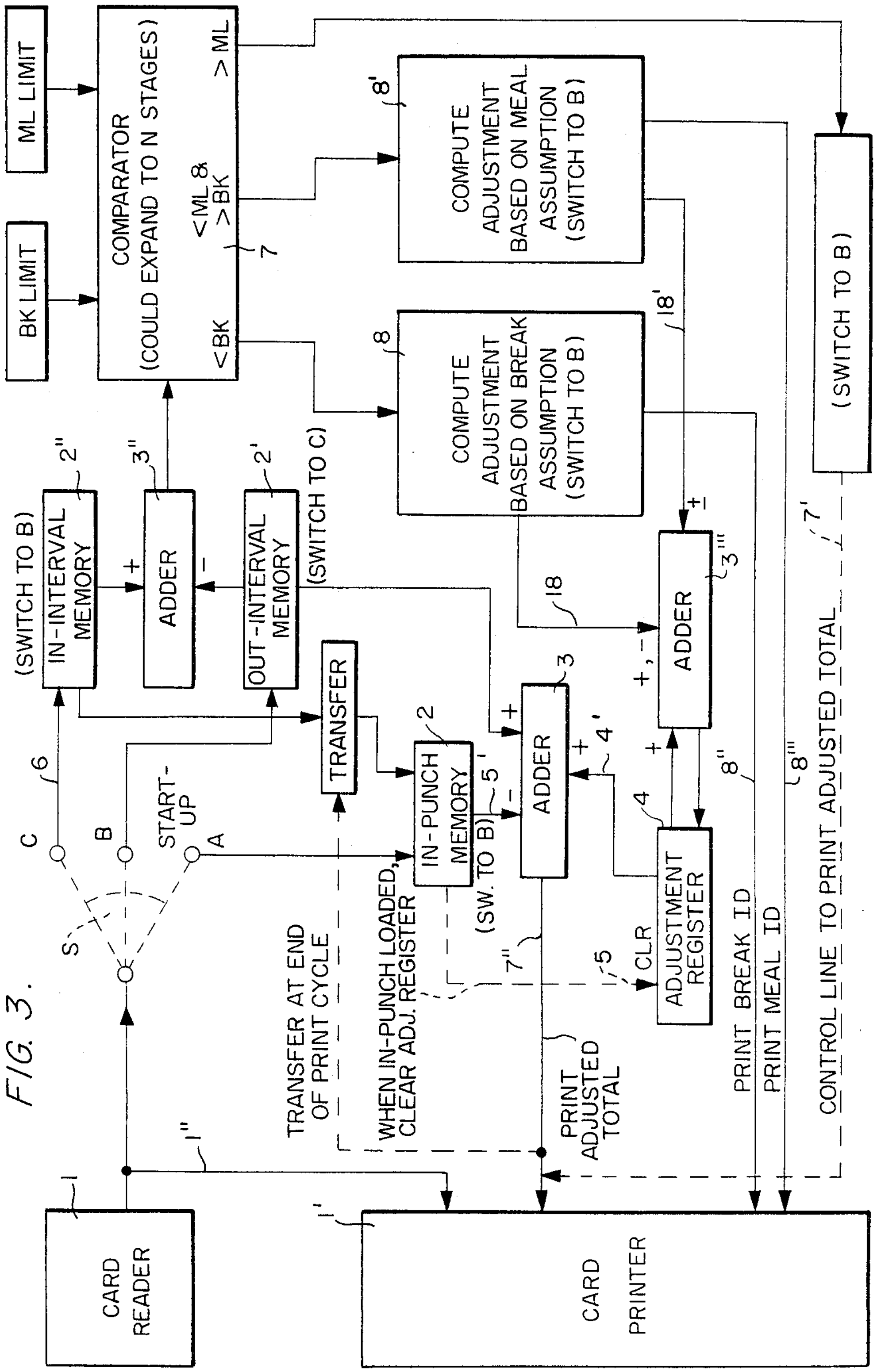

The invention will now be described in connection with the accompanying drawings, FIG. 1 of which is a preferred time-recording card usable with the method of the invention;

FIG. 2 is a general block diagram of a general system with which the invention may be used; and FIG. 3 is a combined block and partial circuit diagram of a preferred embodiment of the invention.

While the timecard of FIG. 1 embodies essentially the features of the card described in said patent adapted for in/out recordings, for purposes of the invention the same is shown provided with an "ID" or identification column between the "Out" and "In" columns, being further provided with two such sets of columns. In FIG. 1, the first check-in or punch-in for the day is labelled P1. Entries P2 and P3 comprise an out/in pair (shown for explanation purposes coupled by an underline which, of course, will not be printed) with an ID label therebetween identifying, for example, a break. Between the entries P4 and P5, on the next line (another out/in interval also shown coupled by an underline) a meal identification M, (lunch or a dinner) is shown in the ID column. Between out/in entries P6 and P7 there is another break (B) identification; and P8 would be the final check-out of the day. It may be noticed that this rearrangement of the card does not require that the total work time for the day be printed until the following check-in punch P9, at which point, the total for the day T1 is printed on the same line. In accordance with such arrangement, the postponement of printing the total enables proper identification of the out intervals as opposed to prior arrangements requiring printing of the daily cummulative hours immediately after the out punch.

Turning now to the block diagram of FIG. 2, the card reader, as of the type described in said patent, is shown to the left at 1 applying the time of check-out and check-in punches to a switch S having two positions A and B, essentially switching between in and out punches. When the switch S is in position A, a punch will be accepted as a check-in punch and is stored in memory 2, while also printing directly via path 1" on the card inserted in the reader 1 and its printer 1' as disclosed in, for example, said patent. The action of storing the in-punch in memory 2 also switches the switch S to position B so that the next punch will be interpreted as a check-out punch. When this out punch arrives, it is also printed via path 1", and it is further stored momentarily in a check-out-punch memory 2', also switching the switch S back to A, again to alternate in and out punches. The out punch is now in a memory 2' so that the in punch previously stored at 2 can be substrated from it in adder 3 and the totals obtained can be printed via 3' on the card, generally on the same line as the out punch.

This generalized system is shown implemented in the detailed diagram of FIG. 3 to work with automatic identification of out/in intervals as before explained in accordance with the concepts underlying the invention. The card reader 1 feeds its punched times to the switch S, now shown having three positions A, B and C. The switch S is initially in position A waiting for an in punch to begin a work period, generally a day, though sometimes there are several work periods in a day. As before explained, when the check-in punch is received, it is both printed on the card in the reader (via path 1") and stored in the in-punch memory 2. At this time, the action of receiving the in punch also clears a set of adjustment registers 4 (by way of path 5) which are to be used to store any adjustments due to breaks and lunches and the like. The action of storing this in-punch also switches the switch S to position B to ready the unit for the next check-out punch. When this check-out punch occurs and is printed via path 1", it is simply stored as an out punch in the out-interval memory 2' and the switch S is switched to position C. Unlike previous card punching operations as in said patent, a total is not computed at this time. When the next punch arrives, interpreted as a check-in punch, it is printed via 1", and then applied to an in-interval memory 2" at 6. There is now an out/in interval to be identified in accordance with the invention by comparing the subtraction of punch out and in times from adder 3" in a comparator 7 having predetermined threshold break and meal-time period limits, BK and ML. This comparator 7 is shown provided with three control outputs, depending upon whether the length of the interval is less than the break limit BL, greater than the meal limit ML, or in-between the break limit and the meal limit, indicated, respectively, at <BK, >ML and <ML and >BK. Less than the break limit<BK will mean interpretation as a break. Greater than the break limit>BK but less than the meal limit<ML means interpretation as a meal; and greater than a meal limit>ML will be interpreted as an end of the work period. Assuming the first two cases, computations are effected based upon the desired way of treating breaks and meals at that particular installation at 8 and 8', and any adjustments are added as later explained into the adjustment register 4 for later use at the end of the work interval, using adder 3'", via 18 and 18'. In addition, signals are applied to the printer 1' via 8" and 8'" to print either the break or the meal identification on the card, respectively. If the comparator 7 indicates the third case, that is that the out interval length is greater than the meal limit (>ML), a signal is generated via 7' to compute the overall total using another adder 3 subtracting the initial in punch stored in its memory (via 5' from the in-punch memory 2) from the final out punch stored in its memory 2". In addition, the operation of this adder 3 also includes the before-mentioned adjustment register 4, via 4', to take into account any adjustments that have been stored along the way for breaks and for meals. The output is routed to the printer at 7" for printing the adjusted total, at the same time of printing as the check-in punch is printed via 1".

There is one final step remaining to be accomplished. At the conclusion of the print operation, the last check-in punch which is still in the in-interval memory 2" must be transferred to the in-punch memory 2 where it is ready for the same operation to be repeated, using that in punch as the start of the new work interval. In computing the over-all adjusted total switch S is switched to position B. The A position of switch S is used just for the initial start up.

A consequence of printing the totals with the in punch following the work period is that at the end of a pay period when the user of the time recording system switches to a new card, the final total does not get to be printed on the card of the first pay period. It can be printed on the new card at the time the in-punch occurs but, of course, then it is not on the card for the original pay period. This may be handled two ways. First of all, after the in punch of the new pay period, the card can be reinserted in the reader-printer 1-1' in order to print the now determined total on the bottom of the card. This command is normally done anyway because it is used further to break out the hours into various overtime categories which are not normally printed on the card line by line. A second alternative is to print out the final totals and also overtime hours on a separate report card. One of these two methods is always used by all users of time-recording systems so that the final total is obtained without having to read it off the card of the following pay period.

The functions illustrated as performed by functional circuit blocks in FIGS. 2 and 3 may obviously be effected by suitable computer software; but suitable types of circuits for achieving these results may include in and out interval memory chips 2, 2', 2" as of the type 74LS364 of TTL integrated circuits; adders 3, 3", 3"' as of the type 74LS283; comparator 7 as of the type 74LS85 and computation circuits 8, 8' made up of the above-mentioned adders and comparators as required for the desired break and lunch adjustments; with the card reader and card printer being of the type described in said patent or used in the "Timeclock ®" models ASM-2000-XX of Kronos Incorporated as described in The Installation and Service manuals dated May, 1981 and March, 1981, respectively.

Further modifications will occur to those skilled in this art, including other forms of recording than printing and other card or recording media formats (using the term card in a generic sense), and such are considered to fall within the spirit and scope of the invention as defined in the appended claims.

What is claimed is:

1. In a timecard recording apparatus, a method of monitoring the time between check-in and check-out of the timecard, that comprises, recording the check-in time on the timecard; storing the times of subsequent check-outs and check-ins; automatically comparing the time interval between each subsequent stored check-out and the next following check-in with predetermined permitted break, meal or related time intervals and recording the same on the timecard; and automatically computing the total time from the initial check-in time to the last check-out time which precedes a subsequent check-in time occurring at a time period following the last check-out time greater than the predetermined time intervals, thereby automatically adjusting to include said permitted time intervals; and recording the total adjusted time upon the card.

2. A method as claimed in claim 1 and in which said total adjusted time is computed and recorded upon the advent of said subsequent check-in time.

3. Timecard recording apparatus having, in combination with a timecard reader and recorder, means controlled by the reader for indicating and recording on the card by the recorder the initial time of check-in and for storing the same in a check-in memory; means for storing the next check-out time and the following check-in time and subtracting the same to determine the out/in time interval therebetween; means for storing permitted break, meal or similar time intervals; comparator means for comparing the predetermined time intervals with the determined said out/in time interval; means responsive to the comparator means when the determined out/in time interval exceeds the permitted time intervals for computing the over-all time, for subtracting the initial check-in from the last check-out, adjusted by any permitted time intervals, and recording the same upon a next-following check-in occurring a time interval after the last check-out greater than the predetermined time intervals.

4. Timecard recording apparatus as claimed in claim 3 and in which the adjustment of permitted time intervals is effected by means for introducing into the last-named subtracting means an adjustment register connected to register time intervals at the comparator means within the permitted time interval limits; and means for thereupon transferring the next following check-in time to the said storing means.

* * * * *